US009469370B2

(12) United States Patent
Britton et al.

(10) Patent No.: US 9,469,370 B2
(45) Date of Patent: Oct. 18, 2016

(54) ACCESSORY CROSS BAR FOR A BICYCLE TRAILER

(71) Applicant: THULE CHILD TRANSPORT SYSTEMS LTD, Calgary (CA)

(72) Inventors: Daniel W. Britton, Calgary (CA); Wesley Justin Fleming, Calgary (CA); Paramjit Singh, Calgary (CA)

(73) Assignee: Thule Child Transport Systems Ltd., Calgary (CA)

( * ) Notice: Subject to any disclaimer, the term of this patent is extended or adjusted under 35 U.S.C. 154(b) by 0 days.

(21) Appl. No.: 13/629,143

(22) Filed: Sep. 27, 2012

(65) Prior Publication Data
US 2014/0015217 A1 Jan. 16, 2014

(30) Foreign Application Priority Data
Jul. 13, 2012 (EP) .................................... 12176350

(51) Int. Cl.
B62K 27/10 (2006.01)
B62B 9/12 (2006.01)
B62B 9/14 (2006.01)
B62K 27/00 (2006.01)
B62B 7/12 (2006.01)

(52) U.S. Cl.
CPC ................. *B62K 27/10* (2013.01); *B62B 9/12* (2013.01); *B62B 9/145* (2013.01); *B62K 27/003* (2013.01); *B62B 7/126* (2013.01)

(58) Field of Classification Search
CPC ....... B60R 9/0426; B62J 11/00; B62J 99/00; B62K 7/10; B62K 7/16

USPC ....................... 280/288.4; 297/184.1, 184.11
See application file for complete search history.

(56) References Cited

U.S. PATENT DOCUMENTS

| 3,208,763 | A | | 9/1965 | Boyd |
| 3,271,048 | A | | 9/1966 | Beesley et al. |
| 4,028,773 | A | | 6/1977 | Morgan |
| 5,267,744 | A | | 12/1993 | Berry et al. |
| 5,344,171 | A | | 9/1994 | Garforth-Bles |
| 5,474,316 | A | * | 12/1995 | Britton .......................... 280/204 |
| 5,522,639 | A | * | 6/1996 | Jaime ....................... 297/184.13 |
| D375,706 | S | | 11/1996 | Haung |
| 5,577,746 | A | | 11/1996 | Britton |

(Continued)

FOREIGN PATENT DOCUMENTS

| CN | 201350918 | 11/2009 |
| DE | 19832259 | 1/2000 |

(Continued)

OTHER PUBLICATIONS

Extended European Search Report for European Patent Application No. 12176350.2 dated Jan. 24, 2013, 6 pages.

(Continued)

Primary Examiner — Brodie Follman
Assistant Examiner — Felicia L Brittman
(74) Attorney, Agent, or Firm — Sheridan Ross P.C.

(57) ABSTRACT

An accessory cross bar for a passenger carrier bicycle trailer comprising a bicycle carrier frame with a coupling arrangement at a front end of the frame for coupling of the bicycle trailer to a bicycle and a push-handle at a rear end of the frame. The accessory cross bar is adapted for horizontal mounting at the rear end of the bicycle trailer frame and has a non-circular cross-section.

10 Claims, 11 Drawing Sheets

(56) References Cited

U.S. PATENT DOCUMENTS

| | | | |
|---|---|---|---|
| 5,799,756 A | 9/1998 | Roberts et al. | |
| D408,768 S | 4/1999 | Baechler et al. | |
| 6,068,284 A | 5/2000 | Kakuda | |
| D442,895 S | 5/2001 | Chiu | |
| D452,195 S | 12/2001 | Baechler | |
| 6,345,835 B1 | 2/2002 | Watkins | |
| 6,368,006 B1* | 4/2002 | Yang et al. | 403/84 |
| 6,402,166 B1 | 6/2002 | Chiu | |
| 6,435,622 B1 | 8/2002 | Kanehisa et al. | |
| 6,634,665 B2 | 10/2003 | Hargroder | |
| D481,976 S | 11/2003 | Everett | |
| 6,671,926 B2 | 1/2004 | Huang | |
| 6,722,690 B2 | 4/2004 | Lan | |
| 6,863,297 B2 | 3/2005 | Shapiro | |
| 6,893,040 B2 | 5/2005 | Hou et al. | |
| 6,976,697 B2 | 12/2005 | Britton et al. | |
| 7,011,321 B2 | 3/2006 | Hargroder | |
| D519,063 S | 4/2006 | Chang | |
| 7,077,420 B1 | 7/2006 | Santoski | |
| D529,844 S | 10/2006 | Chen et al. | |
| 7,246,813 B2 | 7/2007 | Yamazaki et al. | |
| D558,099 S | 12/2007 | Yang | |
| D564,948 S | 3/2008 | Liu | |
| D585,338 S | 1/2009 | Siewertsen | |
| D592,373 S | 5/2009 | Evans et al. | |
| 7,527,283 B2 | 5/2009 | Horacek | |
| 7,547,029 B2 | 6/2009 | Britton et al. | |
| D599,257 S | 9/2009 | Gower et al. | |
| 7,686,322 B2 | 3/2010 | Longenecker et al. | |
| D615,461 S | 5/2010 | Storm | |
| 7,766,368 B2 | 8/2010 | Tsai | |
| 7,845,671 B2 | 12/2010 | Cone, II | |
| 7,891,696 B2 | 2/2011 | Hanson | |
| D633,825 S | 3/2011 | van Leeuwen et al. | |
| 8,205,906 B2 | 6/2012 | Kretschmer et al. | |
| 8,205,907 B2 | 6/2012 | Chicca | |
| D687,352 S | 8/2013 | Shellenberger et al. | |
| 2005/0258611 A1 | 11/2005 | Wu | |
| 2006/0219374 A1* | 10/2006 | McKinney | E04H 15/642 160/395 |
| 2007/0262566 A1 | 11/2007 | Hartenstine et al. | |
| 2008/0079240 A1 | 4/2008 | Yeh | |
| 2008/0143076 A1 | 6/2008 | Klevana et al. | |
| 2009/0008908 A1 | 1/2009 | Kassai et al. | |
| 2009/0127828 A1* | 5/2009 | Longenecker et al. | 280/650 |
| 2010/0244405 A1 | 9/2010 | Assaf | |
| 2011/0012325 A1 | 1/2011 | Gower et al. | |
| 2011/0316258 A1 | 12/2011 | Lin | |
| 2012/0025495 A1 | 2/2012 | Minato et al. | |
| 2012/0056408 A1 | 3/2012 | Wu et al. | |
| 2012/0086189 A1 | 4/2012 | Wu | |
| 2012/0200052 A1 | 8/2012 | Shapiro | |
| 2013/0119641 A1 | 5/2013 | Hu et al. | |
| 2013/0119643 A1 | 5/2013 | Gower et al. | |
| 2013/0154241 A1 | 6/2013 | Parkinson et al. | |

FOREIGN PATENT DOCUMENTS

| | | |
|---|---|---|
| DE | 102010010966 | 9/2011 |
| EP | 0913312 | 5/1999 |
| EP | 1162134 | 12/2001 |
| EP | 2017158 | 1/2009 |
| NL | 1018648 | 2/2003 |
| WO | WO 98/47753 | 10/1998 |
| WO | WO 2009/132985 | 11/2009 |

OTHER PUBLICATIONS

Official Action for U.S. Appl. No. 13/629,150 mailed Mar, 6, 2014, 10 pages.
Notice of Allowance for U.S. Appl. No. 29/440,568 mailed Dec. 20, 2013, 11 pages.
U.S. Appl. No. 13/629,158, filed Sep. 27, 2012, Fleming et al.
U.S. Appl. No. 13/629,150, filed Sep. 27, 2012, Fleming et al.
U.S. Appl. No. 29/440,568, filed Dec. 21, 2012, Britton et al.
Official Action for U.S. Appl. No. 13/629,158 mailed May 9, 2013, 5 pages.
Notice of Allowance for U.S. Appl. No. 13/629,158 mailed Nov. 22, 2013, 7 pages.
Official Action for U.S. Appl. No. 13/629,150 mailed Oct. 23, 2013, 12 pages.
Official Action for U.S. Appl. No. 29/440,568 mailed Oct. 2, 2013, 6 pages.
Official Action for U.S. Appl. No. 13/629,150, mailed Sep. 18, 2014 10 pages.
Extended European Search Report for European Patent Application No. 12176343.7, dated Jan. 25, 2013, 6 pages.
Notice of Allowance for U.S. Appl. No. 13/629,150, mailed Feb. 4, 2015 5 pages.

* cited by examiner

ACCESSORY CROSS BAR FOR A BICYCLE TRAILER

CROSS REFERENCE TO RELATED APPLICATIONS

This application claims the benefit of European Patent Application No. 12176350.2, filed Jul. 13, 2012, the entire disclosure of which is incorporated by reference herein.

TECHNICAL FIELD

The invention relates to an accessory cross bar for a passenger carrier bicycle trailer having a frame with a coupling arrangement for coupling of the trailer to a bicycle at a front end of the bicycle trailer and a push-handle at a rear end of the bicycle trailer.

BACKGROUND

Passenger carriers, in particular child carriers that are equipped to be used both as bicycle trailers and as manually pushed infant strollers for use by a walking or jogging person are disclosed in U.S. Pat. No. 5,344,171, U.S. D633,825 S, US 2008/0143076 A1 and US 2010/0244405 A1. When decoupled from a bicycle, the trailer can be converted into a push-type carrier provided with a generally horizontally arranged push-handle to allow the trailer to be pushed by a walking person in a manner corresponding to that of a conventional baby carrier or stroller.

Particular demands are put on a combined stroller-trailer as it needs to be light-weight while still having a strong and durable frame in order to withstand being pulled after a bicycle over a rough surface at speeds that may be considerably higher than the speeds that are attained with conventional baby carriages and strollers which are designed for walking and running speeds. It is further generally desirable that the bicycle trailers are foldable in order to occupy as little space as possible during storage or when being transported, e.g. in a car.

Moreover, the previously known dual-function bicycle trailers are optimized with regard to the trailer function, implying that they lack such accessory equipment which would be desirable in a stroller but which is not needed in a bicycle trailer. Such accessory equipment includes baskets, bags, carrier hooks, etc.

Accordingly, an object of the invention is to provide a means for improving the function of a passenger carrier bicycle trailer, and in particular to improve the function of a bicycle trailer that can be used as a stroller.

SUMMARY OF THE INVENTION

In accordance with the invention there is offered an accessory cross bar for a passenger carrier bicycle trailer, the bicycle trailer comprising a frame with a coupling arrangement at a front end of the frame for coupling of the bicycle trailer to a bicycle and a push-handle at a rear end of the frame. The accessory cross bar is adapted for horizontal mounting at the rear end of the bicycle trailer frame and has a non-circular cross-section.

When mounted on a bicycle trailer frame, the accessory cross bar constitutes an additional transverse reinforcement member, increasing stability of the trailer frame. The non-circular cross-section of the accessory cross bar enhances torsional resistance in the trailer frame, which may be particularly advantageous when the bicycle trailer is used in the trailer mode. When the bicycle trailer is used in the stroller mode, the accessory cross bar may be used for attaching accessories such as bags, baskets, and other luggage containers as well as holders and fixtures for cups, bottles, mobile phones, electronic monitoring devices, lights, bells, etc.

The accessory cross bar will generally be mounted in front of and/or below the push-handle at the rear end of the bicycle trailer. Common push-handles have a generally horizontally arranged gripping portion that may be straight or curved and that is connected by two generally vertically arranged struts or legs at each side of a bicycle trailer passenger compartment. The push-handle may be pivotably connected at the sides of the passenger compartment so that the angle and height of the gripping part may be adjusted. Furthermore, the bicycle trailer may have one handle at each side of the passenger compartment or a combination of a loop-shaped push-handle and side handles. The accessory cross bar may preferably be designed to be mounted between the struts or legs, and may be placed at an upper edge or slightly above an upper edge of the passenger compartment and at a distance from the gripping portion of the push-handle.

The accessory cross bar of the invention is designed for mounting horizontally at the rear end of a bicycle trailer and has an upper part and a lower part in a vertical direction of the accessory cross bar and of the bicycle trailer. At least the upper part of the accessory cross bar may have a rounded surface. Preferably, a major part of the outer surface of the accessory cross bar is rounded so that the accessory cross bar has no sharp edges or corners that may cause discomfort or even hurt a person gripping the cross bar such as a walking child or someone attaching the cross bar to the bicycle trailer frame. A rounded profile on the accessory cross bar is also beneficial in that it conforms to the aerodynamic design of the bicycle trailer frame.

The accessory cross bar may have an asymmetric shape in a horizontal direction. As used herein, the horizontal direction of the accessory cross bar refers to a direction from the front to the rear of the cross bar as it appears when correctly mounted on a bicycle trailer frame. An asymmetric horizontal shape of the accessory cross bar may be advantageous in that it may be used to ascertain that the accessory cross bar is correctly mounted on the bicycle trailer frame and/or that any accessories are correctly mounted on the accessory cross bar. This is achieved by adapting any coupling members used for coupling of the accessory cross bar to the bicycle trailer frame or an accessory to the accessory cross bar to the shape of the accessory cross bar. Thereby, the specially designed coupling members will engage in a predetermined manner with the asymmetrically shaped accessory cross bar, preventing incorrect mounting of the accessory cross bar and/or of the accessories.

The accessory cross bar is preferably hollow and comprises an outer wall and an interior cavity. A hollow accessory cross bar having a non-circular cross-section can be made highly resistant to torsional forces while still being light-weight. Suitable materials for the accessory cross bar may be metal, preferably aluminium or titanium, light-weight composite materials or plastic that can be formed into a profiled accessory cross bar by conventional methods. The accessory cross bar may have one or more openings extending in a longitudinal direction of the accessory cross bar in the outer wall of the accessory cross bar in order to permit access from the outside to an inner cavity. A longitudinal opening in the wall of the accessory cross bar will appear as a track extending along the cross bar. When a fixture or holder for an accessory is inserted into the inner cavity of the accessory cross bar, a portion of the fixture or holder will protrude out of the longitudinal opening. In the case of the accessory being e.g. a canvas covering for the trailer frame, it will typically be the covering itself that protrudes out of the opening.

One or more vertical walls, such as one vertical wall or two vertical walls may be arranged in the interior cavity, dividing the interior cavity into sub-cavities. When at least two vertical walls are arranged in the inner cavity, the accessory cross bar may comprise an inner horizontal wall extending between two inner vertical walls in the interior cavity, resulting in the accessory cross bar having an inner H-shaped profile.

The inner cavity or one or more sub-cavities inside the accessory cross bar may be arranged to receive and retain a fastener element for an accessory. The fastener element may be arranged to be slid into the cavity from an end opening in the accessory cross bar with a portion of the fastener element or the accessory protruding out through an elongated opening in the wall of the accessory cross bar. Alternatively, the fastener element may be snapped into the cavity through an elongated opening in the outer wall of the accessory cross bar.

Snap-in accessories may include light fixtures, bells, holders for mobile phones, cup holders etc. which may be placed anywhere along the track formed by the elongated opening in the wall of the accessory cross bar. It is also conceivable to use snap-in fixtures for attaching a covering extending the full length of the accessory cross bar.

Slide-in accessories may include a covering for the bicycle trailer frame, wherein an end portion of such a covering may be inserted and retained in the inner cavity. However, also different types of holders and fixtures for other accessories may be attached to the accessory cross bar by means of a slide-in arrangement. The slide-in fastening option is normally more permanent than the snap-in fastener option as affixing and removal of the accessory requires the accessory cross bar to be detached from the bicycle trailer frame in order to access a slide-in opening at the end of the accessory cross bar. Accordingly, an accessory cross bar that is formed integral with the bicycle trailer frame by the manufacturer of the bicycle trailer may have non-removable slide-in accessories fastened to the accessory cross bar by the manufacturer. Such non-removable accessories may be a covering for a passenger compartment, and/or fixtures and holders constituting permanent equipment of the bicycle trailer.

Commonly available bicycle trailers have a passenger compartment with side walls and a textile or plastic covering sheet material forming a front wall, a roof and a rear wall and optionally also the side walls. The accessory cross bar may comprise two inner sub-cavities each arranged to receive and retain an end portion of a cover sheet for covering of the bicycle trailer frame. Accordingly, a first inner sub-cavity may be arranged to receive and retain an end portion of a covering sheet arranged to form a front and roof wall and optionally also side walls of the passenger compartment and a second inner sub-cavity may be arranged to receive and retain an end portion of a covering sheet arranged to form a rear wall of the passenger compartment.

The accessory cross bar of the invention may have accessories that are attached on the outside of the accessory cross bar as well as accessories attached by being inserted into an inner cavity in the accessory cross bar either by sliding-in through an end opening in the accessory cross bar or by a snap-in attachment through a longitudinal opening or track in the accessory cross bar.

The accessory cross bar may be an integral, pre-mounted part of the bicycle trailer frame. An integral accessory cross bar provides the manufacturer with a means of deciding the exact positioning of the accessory cross bar on the bicycle trailer frame and to ascertain correct and secure mounting of any permanent equipment attached to the accessory cross bar. An integral accessory cross bar will also add minimal weight to the bicycle trailer frame as no fastener elements for fastening of the accessory cross bar to the bicycle trailer frame are needed. Furthermore, by making a pre-mounted accessory cross bar with a non-symmetrical cross-section, the manufacturer can ascertain that any user mounted accessories are mounted in a correct way on the accessory cross bar.

Alternatively, the accessory cross bar may be separate from the bicycle trailer frame such that it may be attached to the bicycle trailer frame by a user of the bicycle trailer. A separate accessory cross bar may comprise attachment members for repeated attachment and removal of the accessory cross bar from the bicycle trailer frame. A separate accessory cross bar avails a user with the option of deciding whether to mount an accessory cross bar or not on the bicycle trailer. Furthermore, a separate accessory cross bar can be removed from the bicycle trailer when not needed, for instance when there is a desire to minimize the weight of the bicycle trailer. A separate accessory cross bar may be conveniently stored by a user optionally together with any accessories affixed thereto during periods when it is not needed and can subsequently be attached to the bicycle trailer frame together with the accessories when desired.

A separate accessory cross bar may be provided with means for length adjustment so that it may be adapted to fit differently sized bicycle trailers. Such length adjustment means may be accomplished e.g. by providing the accessory cross bar with telescopically movable portions or by arranging an adjustment screw or similar at one or both ends of the accessory cross bar. Length adjustment means may be provided in the attachment members used for attaching the accessory cross bar to the bicycle trailer frame. In order to increase stability of the accessory cross bar and to prevent unintentional length changes, the length adjustment means preferably includes locking means for ascertaining that the accessory cross bar retains a selected length when the accessory cross bar is mounted on a bicycle trailer frame.

According to the invention, there is also provided a passenger carrier bicycle trailer comprising a frame with a coupling arrangement at a front end of the frame for coupling of the bicycle trailer to a bicycle and a push-handle at a rear end of the frame, and further an accessory cross bar mounted horizontally on the bicycle trailer frame as disclosed herein.

DEFINITIONS

As used herein, the terms "trailer", "bicycle trailer", "stroller", "passenger carrier" and "carrier" are used interchangeably to refer to a dual-function vehicle that can either be connected to a bicycle in order to be pulled after the bicycle or be used on its own as hand-pushed carrier. The terms reflect the different functions of the claimed bicycle trailer.

By a horizontal direction as used herein is implied a direction in a horizontal plane of a bicycle trailer when in an in-use-position, i.e. while being pulled after a bicycle or being pushed by a person. A horizontal direction of an accessory cross bar is a direction coinciding with a horizontal direction of a bicycle trailer.

By a vertical direction as used herein is implied a direction in a vertical plane through a bicycle trailer when in an in-use-position, i.e. while being pulled after a bicycle or being pushed by a person. A vertical direction of an accessory cross bar is a direction coinciding with a vertical direction of a bicycle trailer.

By a front part of a bicycle trailer as used herein is implied a part that is intended to be facing towards a bicycle when the bicycle trailer is coupled to a bicycle or to be facing away from a pusher of the bicycle trailer when it is used as a stroller. In analogy therewith, a front part of a bicycle trailer frame or of an accessory cross bar is a part intended to be facing towards a bicycle or away from a person pushing the bicycle trailer.

A back or rear part of a bicycle trailer, bicycle trailer frame or accessory cross bar is a part opposite to the front part and intended to be facing away from a bicycle or towards a person depending on how the bicycle trailer is being used.

BRIEF DESCRIPTION OF THE DRAWINGS

The invention will be described in greater detail with reference to the appended drawings in which.

DETAILED DESCRIPTION

Figure 1:
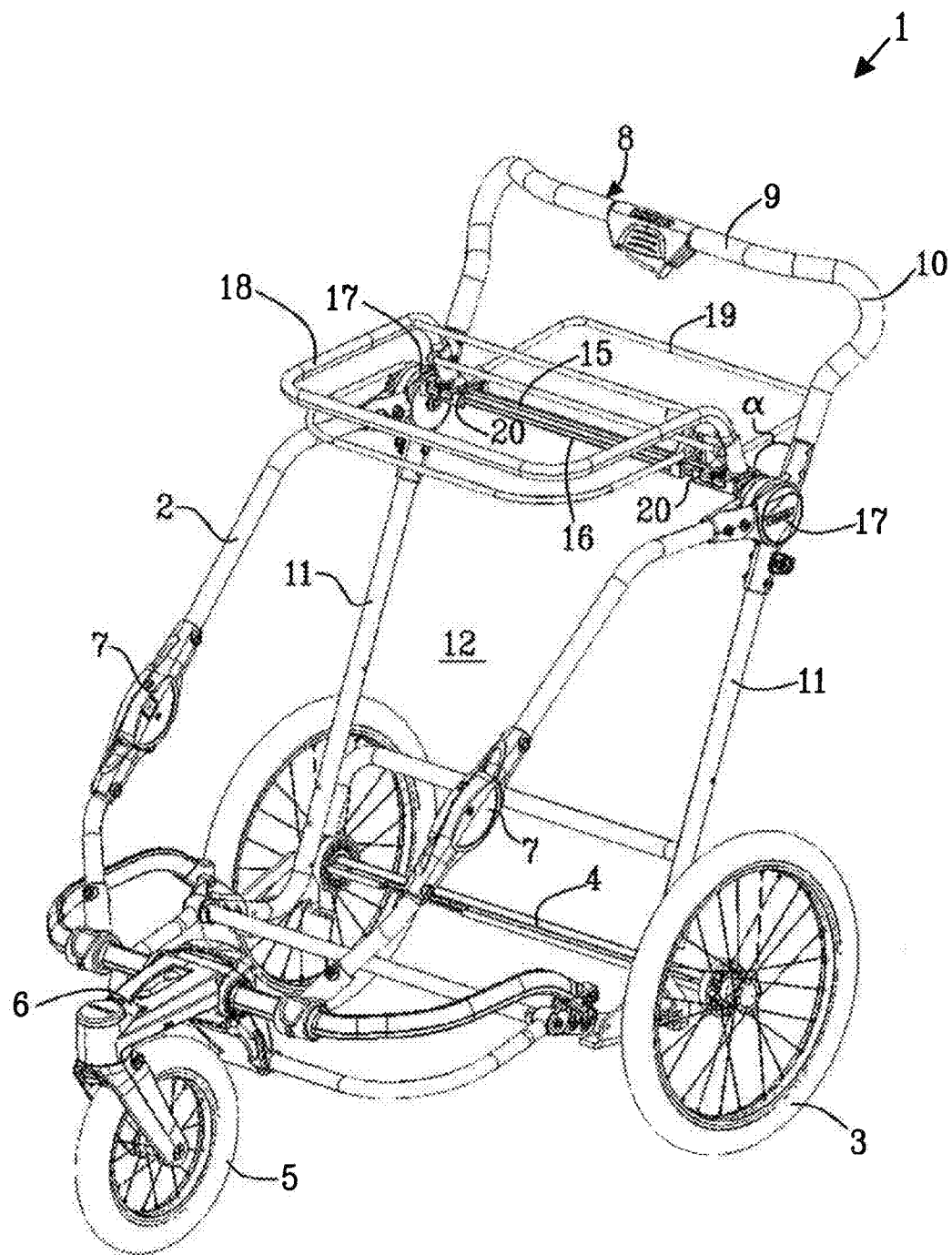
FIG. 1 shows a perspective view of a bicycle trailer in a stroller mode with an accessory cross bar permanently attached to the bicycle trailer frame.

The bicycle trailer 1 in FIG. 1 is shown without any covering, revealing the structure of the bicycle trailer frame 2. The bicycle trailer 1 can be used in a trailer mode, coupled to the rear end of a bicycle and in a stroller mode allowing it to be pushed by a walking or running person. The bicycle trailer 1 in FIG. 1 is shown in the stroller mode, i.e. without any connection to a bicycle. Apart from the bicycle trailer frame 2 and the covering that is absent in FIG. 1, the bicycle trailer 1 comprises two rear wheels 3 mounted on a horizontal rear axis 4 and a front wheel 5 pivotably mounted at the front of the bicycle trailer 1. When the bicycle trailer 1 is in the trailer mode, it is coupled to the rear end of a bicycle by means of a coupling device 6 arranged at the front end of the bicycle trailer 1.

The bicycle trailer 1 shown in FIG. 1 can be folded into a compact transport and storage configuration by folding the bicycle trailer frame 2 at lockable joints 7. Foldability is generally a desired feature of a bicycle trailer but is not an essential feature of the bicycle trailer 1 according to the invention.

The bicycle trailer frame 2 further comprises a push-handle 8 at the rear end of the bicycle trailer frame 2. The push-handle 8 is shown with a generally horizontally arranged central gripping portion 9 and curved gripping portions 10 at each end of the central gripping portion 9 allowing the handle to be gripped with the hands either on the straight central gripping portion 9 or at the curved end portions 10. The push-handle 8 is shown to form an arch-like connection between two generally vertically arranged struts 11 at each side of a bicycle trailer 1 passenger compartment 12 defined inside the bicycle trailer frame 2. An accessory cross bar 15 is shown to be mounted between the struts 11, and to be placed at an upper edge 16 of the passenger compartment 12 at a distance from the horizontal central gripping portion 9 of the push-handle 8.

Figure 8:
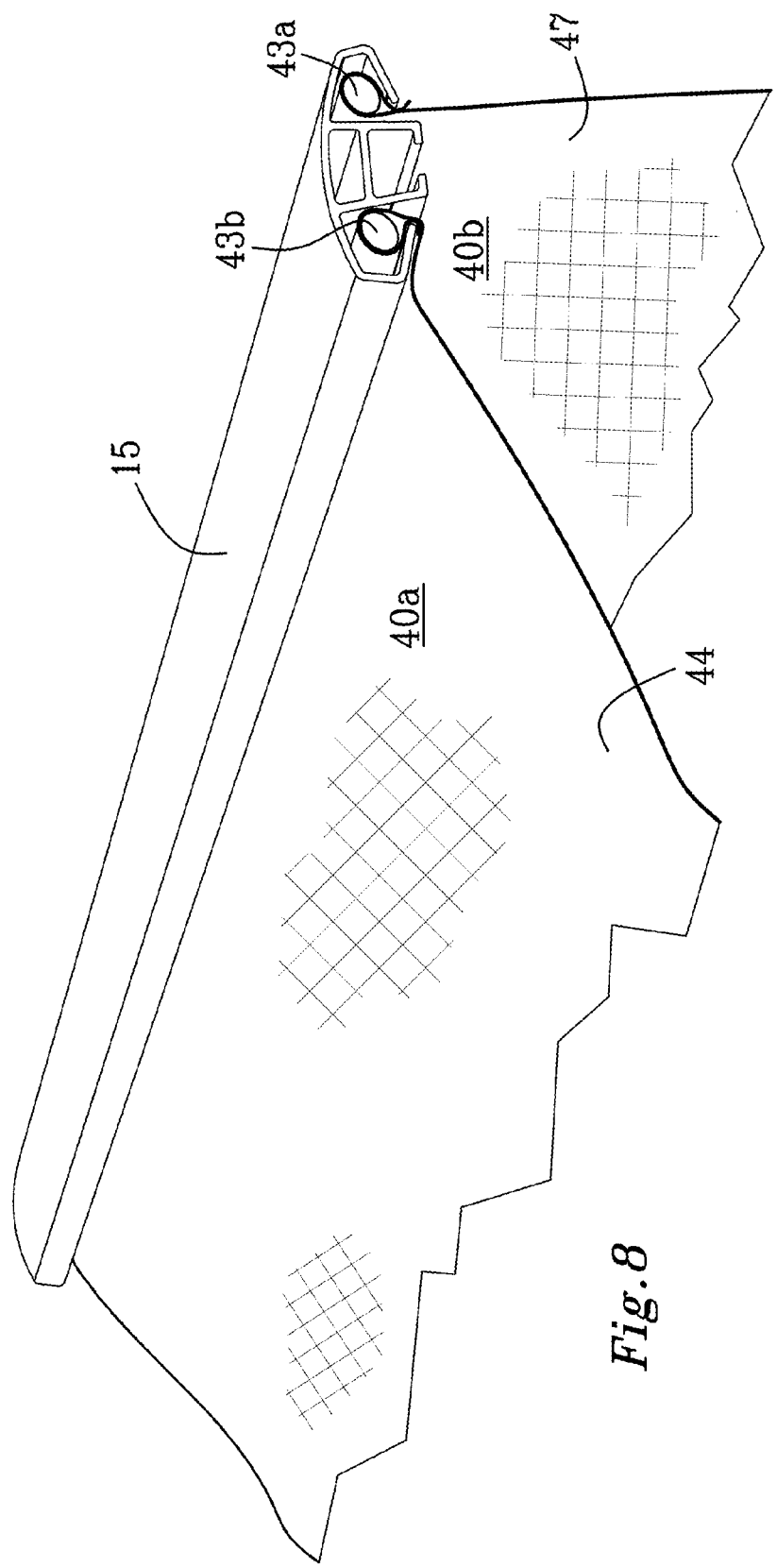
FIG. 8 shows a perspective view of the accessory cross bar in FIG. 7.

The specific shape and construction of the push-handle 8 that is shown in FIG. 8 should not be considered limiting to the invention, as many other shapes may be envisaged by a person skilled in the art. Accordingly, an accessory cross bar 15 of the invention may be used with any design of push-handle or push-handles as known in the art. Furthermore, it is to be understood that the shape and construction of the bicycle trailer frame 2 may be different from that shown in FIG. 1. For instance, the shape of the passenger compartment may be different, the bicycle trailer may have two front wheels, etc.

The accessory cross bar 15 is shown to be permanently mounted on the bicycle trailer frame 2 by means of end fixtures 17 such that the accessory cross bar 15 is an integral component of the bicycle trailer frame 2.

Furthermore, the bicycle trailer 1 in FIG. 1 is shown with two accessories 18,19 attached to the accessory cross bar 15 by means of clamping members 20 which grip the accessory cross bar 15 from above and hold the accessories firmly in place on the accessory cross bar 15. The first accessory 18 is a frame for a front luggage compartment that may be used to hold a computer or similar item, and the second accessory 19 is a frame for a device that may be a holder for cups, cans, keys, a wallet, a mobile phone, etc. The shown accessories 18,19 are only examples of accessories that may be attached to the accessory cross bar 15 and it should be understood that any other type of accessory may be attached to the accessory cross bar 15, as disclosed herein. Similarly, the clamping members 20 may be substituted with other types of fastening means such as screw-on fasteners, snap-on fasteners, etc. as known in the art.

Figure 2:
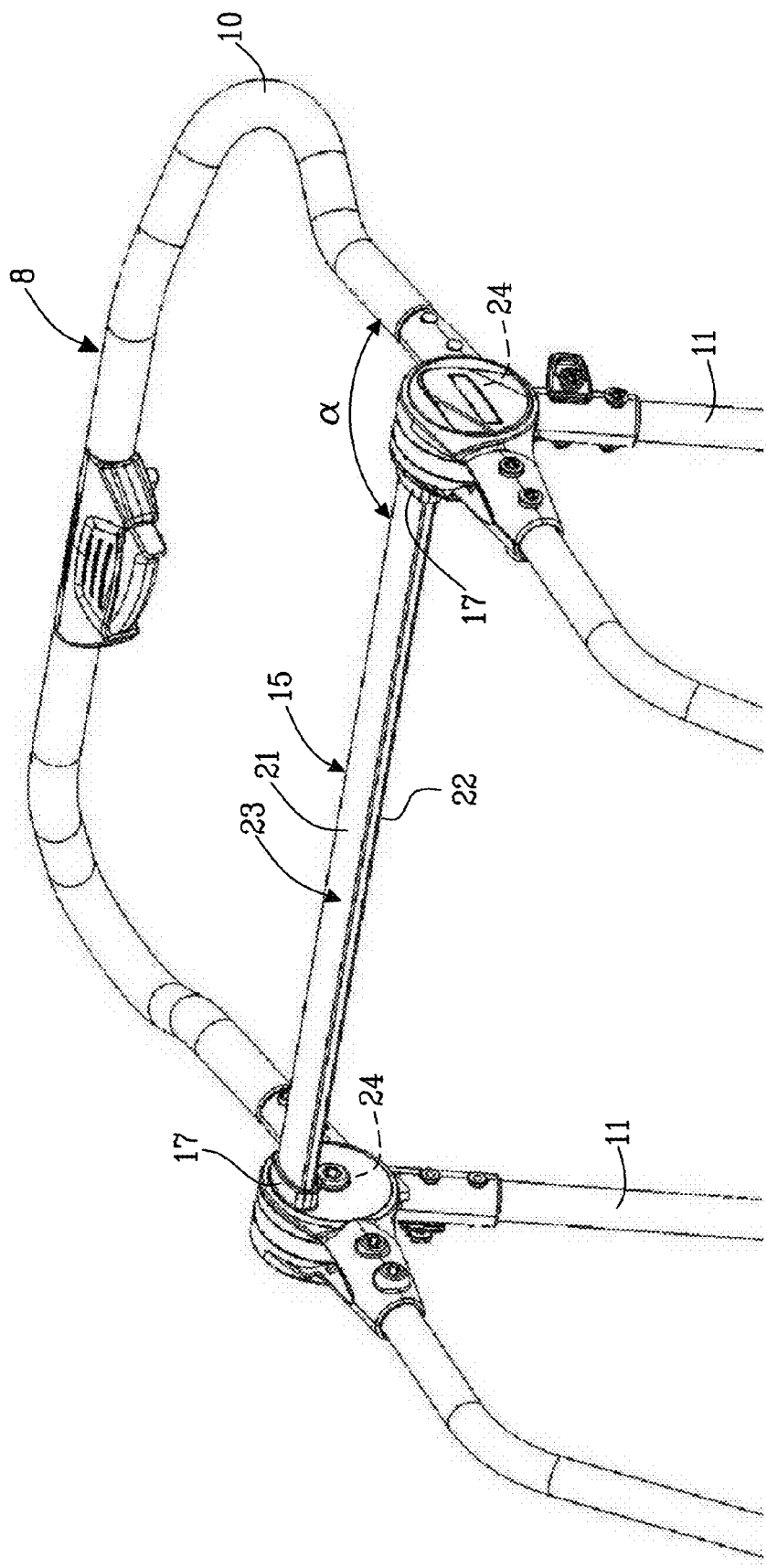
FIG. 2 shows a detail view of the bicycle trailer in FIG. 1 in the area of the accessory cross bar without any accessories mounted on the accessory cross bar.

FIG. 2 shows a portion of the bicycle trailer frame 2 in FIG. 1 in the area of the accessory cross bar 15. The accessory cross bar 15 is shown without any accessories mounted thereon revealing that it has a flattened shape with an upper part 21 and a lower part 22 and a rounded upper surface 23 at the upper part 21 of the accessory cross bar 15.

The bicycle trailer frame in FIGS. 1 and 2 has an adjustable push-handle 8. The push-handle is attached to the struts 11 with pivot joints 24 which allow the angle α between the push-handle 8 and the struts 11 to be adjusted.

In FIG. 1 the push-handle 8 is shown in a generally upright position with the horizontally arranged central gripping portion 9 raised above the accessory cross bar 15. FIG. 2 shows the push-handle 8 in a position where it is almost level with the accessory cross bar 15.

Figure 3:
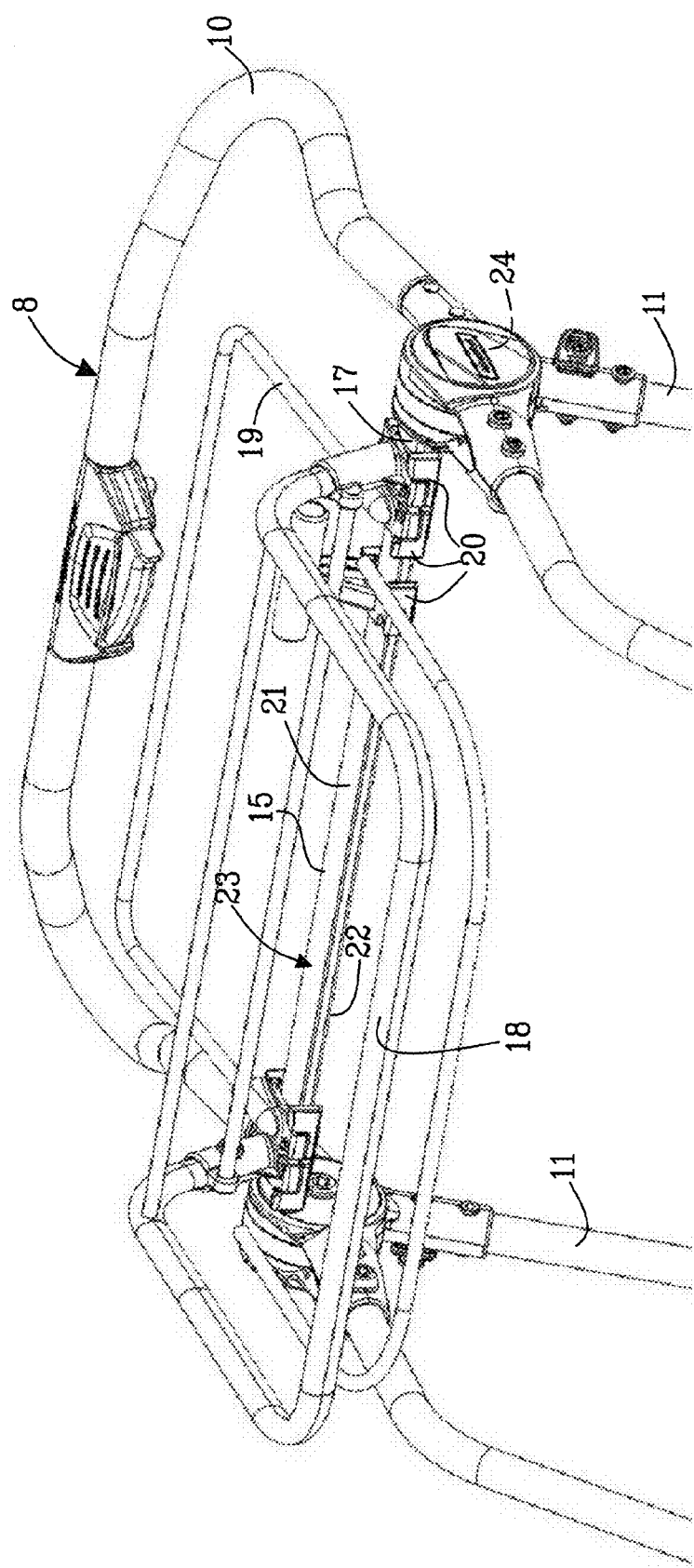
FIG. 3 shows a detail view of the bicycle trailer in FIG. 1 in the area of the accessory cross bar and with accessories mounted on the accessory cross bar.

FIG. 3 shows a view similar to the view in FIG. 2 but with the accessories 18,19 as shown in FIG. 1 mounted on the accessory cross bar by means of the clamping members being clamped over the rounded upper surface 23 of the upper part 21 of the accessory cross bar 15.

Figure 4:
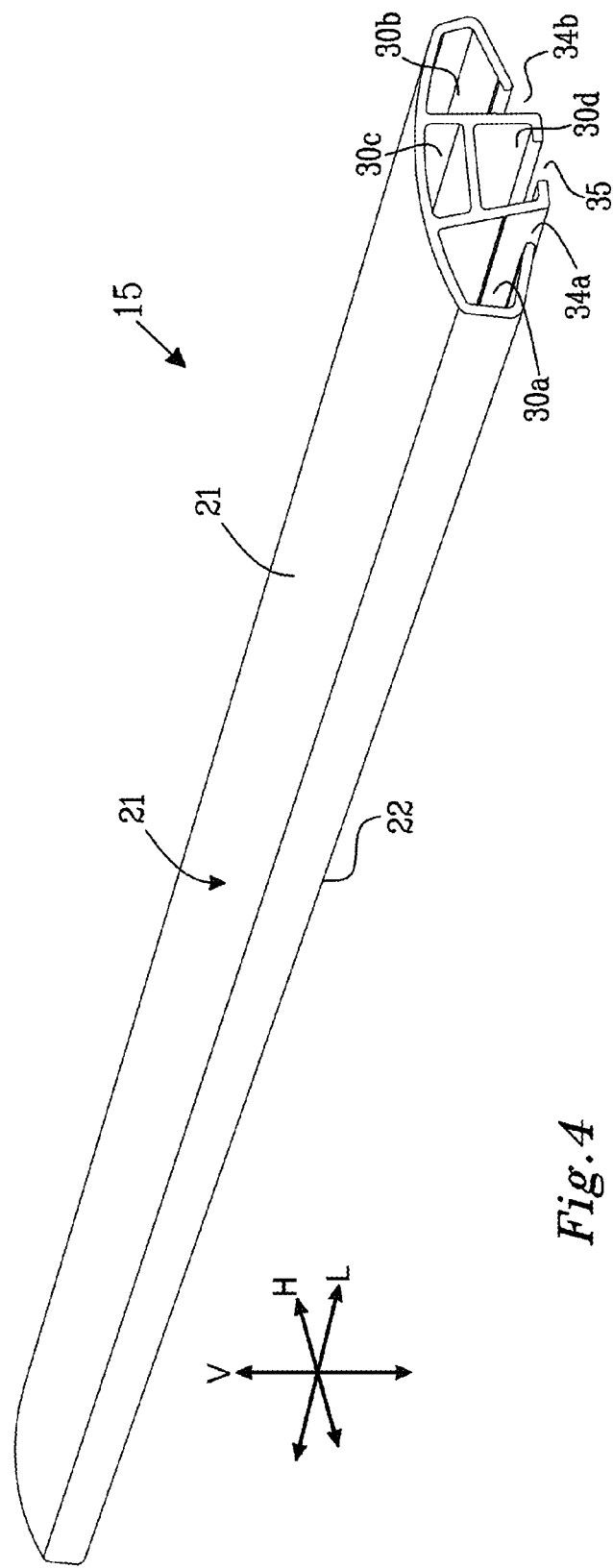
FIG. 4 shows a perspective view of a accessory cross bar profile.
Figure 5:
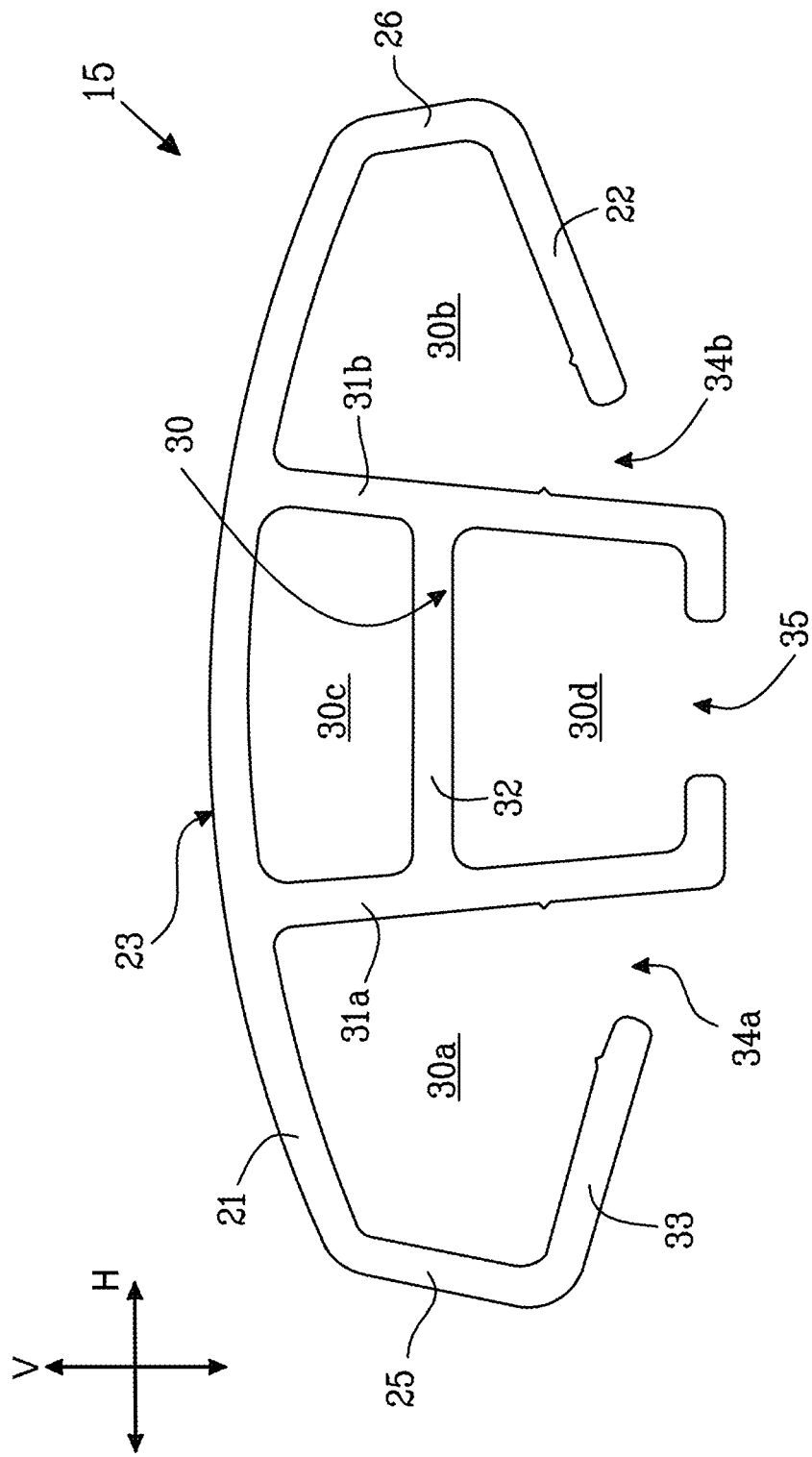
FIG. 5 shows an end view of the accessory cross bar profile in FIG. 4.

FIGS. 4 and 5 show an accessory cross bar 15 which may be used with the bicycle trailer frame 2 in FIGS. 1-3. However, it is to be understood that the inner structure of the accessory cross bar 15 in FIGS. 4 and 5 are optional features of the accessory cross bar 15 in FIGS. 1-3. As in FIGS. 1-3, the accessory cross bar 15 in FIGS. 4 and 5 is shown to have a flattened shape in the vertical direction V, with an upper part 21 and a lower part 22 and a rounded upper surface 23 at the upper part 21 of the accessory cross bar 15. The accessory cross bar 15 has a front portion 25 and a rear portion 26 which are intended to be facing to the front and to the rear, respectively, when the accessory cross bar 15 is mounted in a bicycle trailer. As is seen in FIG. 5, the front portion 25 and the rear portion 26 differ somewhat in shape so that the accessory cross bar 15 is asymmetrical in the horizontal direction H.

The accessory cross bar 15 in FIGS. 4 and 5 is hollow with an internal cavity 30 divided into subcavities 30a, 30b, 30c and 30d by two inner vertical walls 31a, 31b and an inner horizontal wall 32. The inner vertical walls 31a, 31b and the inner horizontal wall 32 form a generally H-shaped inner profile inside the outer wall 33 of the accessory cross bar 15. The inner walls 31a, 31b and 32 constitute an inner reinforcing and stabilizing structure inside the accessory cross bar 15 and also have the function of delimiting the subcavities 30a-30d which may be used to receive and retain portions of fixtures and accessories as disclosed herein.

The accessory cross bar 15 has three elongated openings 34a, 34b and 35 extending in in the outer wall 33 in the longitudinal direction L of the accessory cross bar 15. The elongated openings 34a, 34b and 35 permit access from the outside to the inner subcavities 30a and 30b in the front and rear portions 25, 26 of the accessory cross bar 15 and to a central subcavity 30d in the lower part 22 of the accessory cross bar 15. The longitudinal openings 34a, 34b and 35 in the outer wall 33 of the accessory cross bar 15 appear as longitudinal tracks in the lower part 22 of the accessory cross bar 15.

Figure 6:
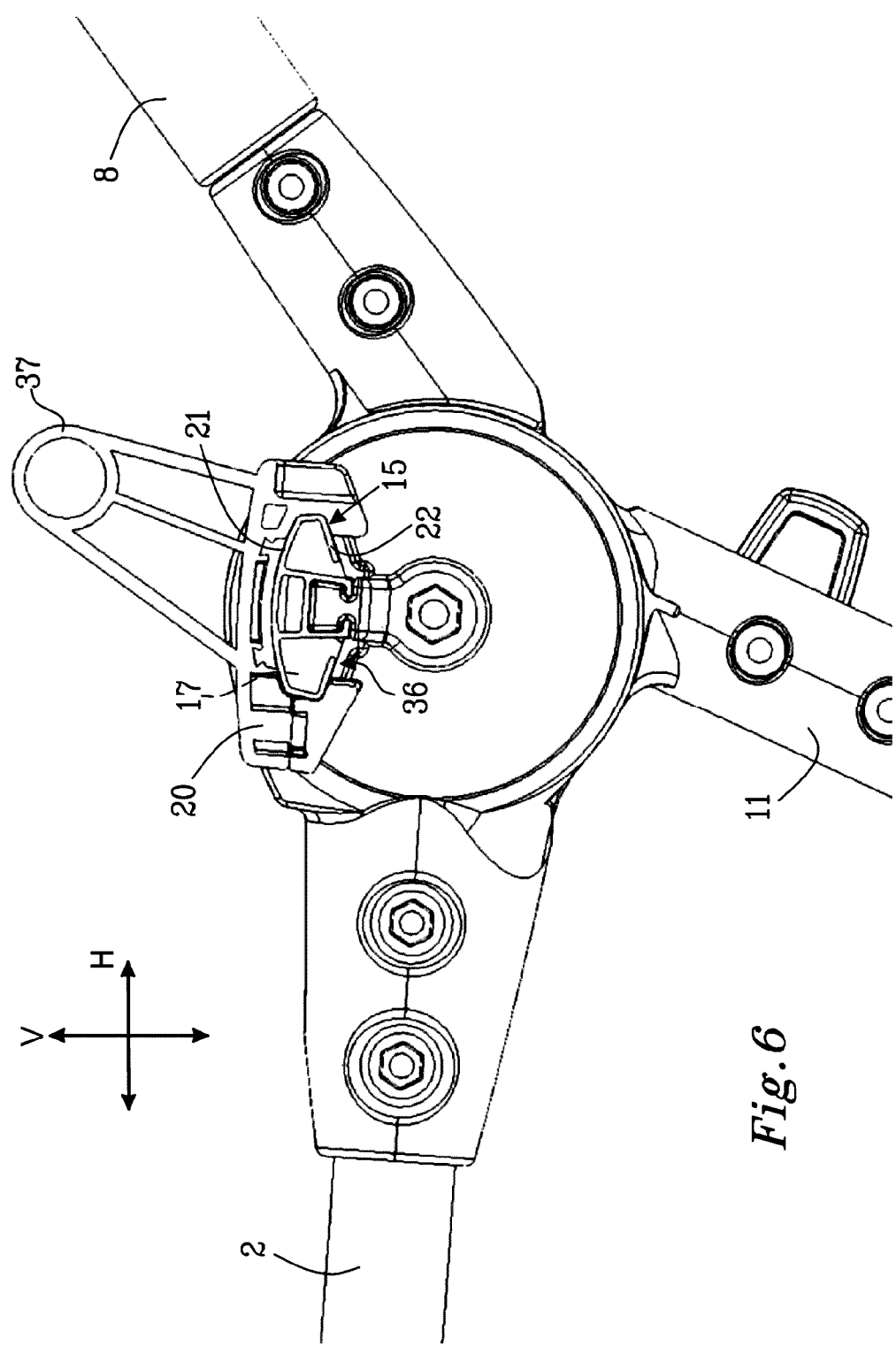
FIG. 6 shows a side detail view of an accessory cross bar attached at one end to a bicycle trailer frame.

FIG. 6 is a view of an end 36 of the accessory cross bar 15 in FIGS. 4 and 5 which for the purpose of illustration is shown attached only with the non-visible opposite end in a fixture 17 on a bicycle trailer frame 2. The accessory cross bar 15 has an accessory 37 in the form of a fixture for an electronic device such as a speedometer or similar attached thereto by means of a clamping member 20 which is clamped over the upper part 21 of the accessory cross bar 15. The clamping member 20 has a shape which is adapted to the asymmetrical shape of the accessory cross bar 15 so that the clamping member will only fit on the accessory cross bar 15 in the way shown in FIG. 6. In this manner, it is ascertained that the accessory is correctly mounted on the accessory cross bar 15.

Figure 7:
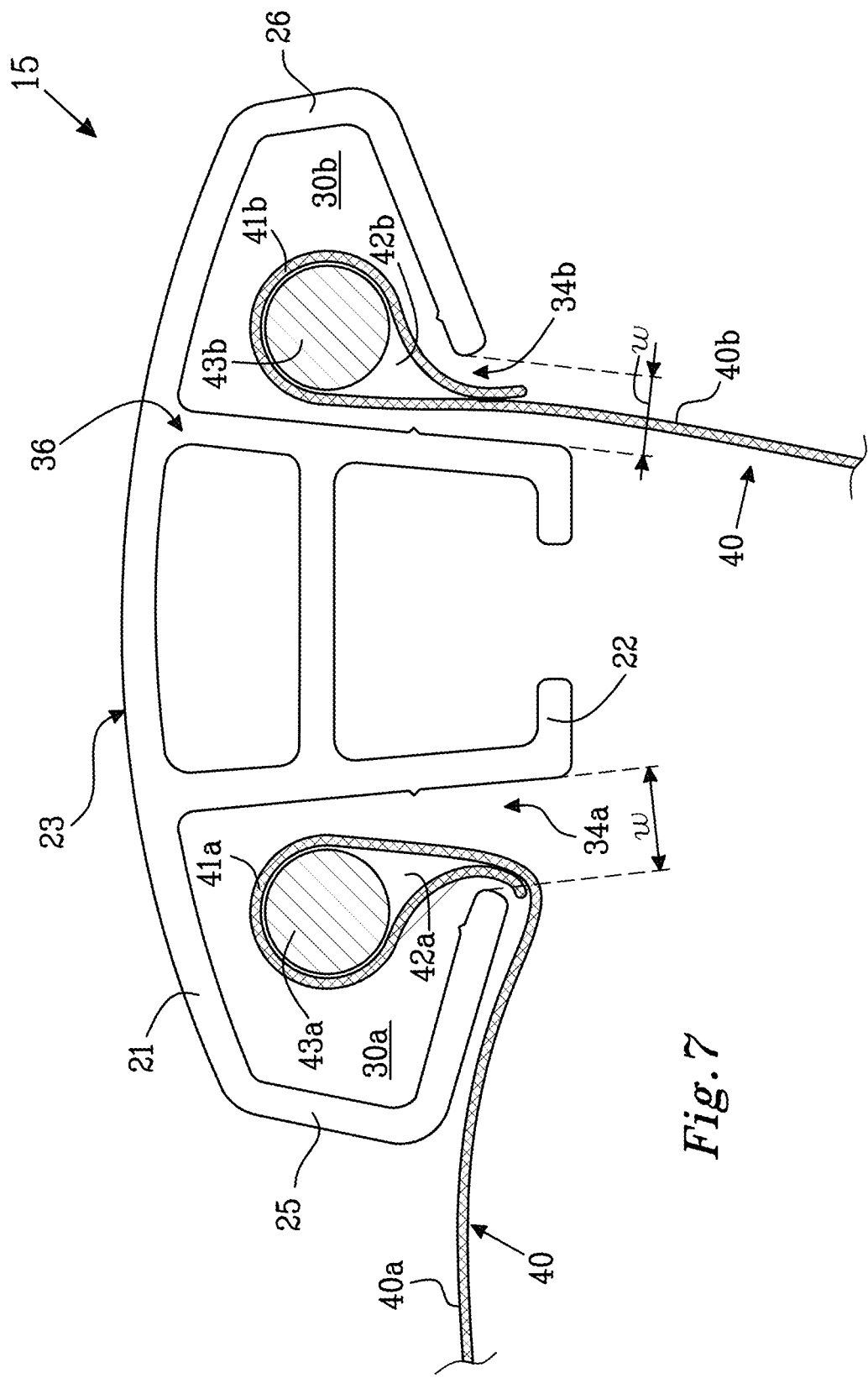
FIG. 7 shows an end view of an accessory cross bar with two cover material sheets mounted on the accessory cross bar.

FIGS. 7 and 8 show the accessory cross bar 15 in FIGS. 4-6 being used for securing a covering 40 for the passenger compartment of a bicycle trailer frame (not shown in FIG. 7). The covering comprises a front covering sheet 40a and a rear covering sheet 40b. The covering sheets 40a, 40b each have an end portion 41a, 41b. A fold has been created at each end portion 41a, 41b of the covering sheets 40a, 40b and the folded-over parts of the covering sheets 40a, 40b have been sealed along their free end to form longitudinal channels 42a, 42b into which a rods 43a, 43b have been inserted. The rods 43a, 43b having the covering sheets 40a, 40b secured thereto are shown to be inserted and retained in the front and rear inner subcavities 30a, 30b in the accessory cross bar 15. The rods 43a, 43b can be introduced into the subcavities 30a, 30b by sliding the rods 43a, 43b in at the open end of the accessory cross bar 15 with the front and rear covering sheets 40a, 40b extending out through the elongated openings 34a, 34b in the lower part 22 of the accessory cross bar 15. Once inserted into the subcavities 30a, 30b, the rods 43a, 43b act as stopping members prohibiting the ends of the covering sheets 40a, 40b from being pulled out of the elongated openings 30a, 30b in a direction perpendicular to the direction of extension of the elongated openings 30a, 30b. In order to act as stopping members for keeping the covering sheets 40a, 40b secured to the accessory cross bar 15, the diameter, d, of the rods 43a, 43b is greater than the width, w, of the elongated openings 34a, 34b.

The accessory cross bar 15 may be of the kind that is formed integral with the bicycle trailer frame by the manufacturer of the bicycle trailer such that the covering is a permanent, non-removable part of the bicycle trailer. Alternatively, the accessory cross bar 15 is a separate part allowing a user of the bicycle trailer to attach and remove the covering as desired.

Figure 9:
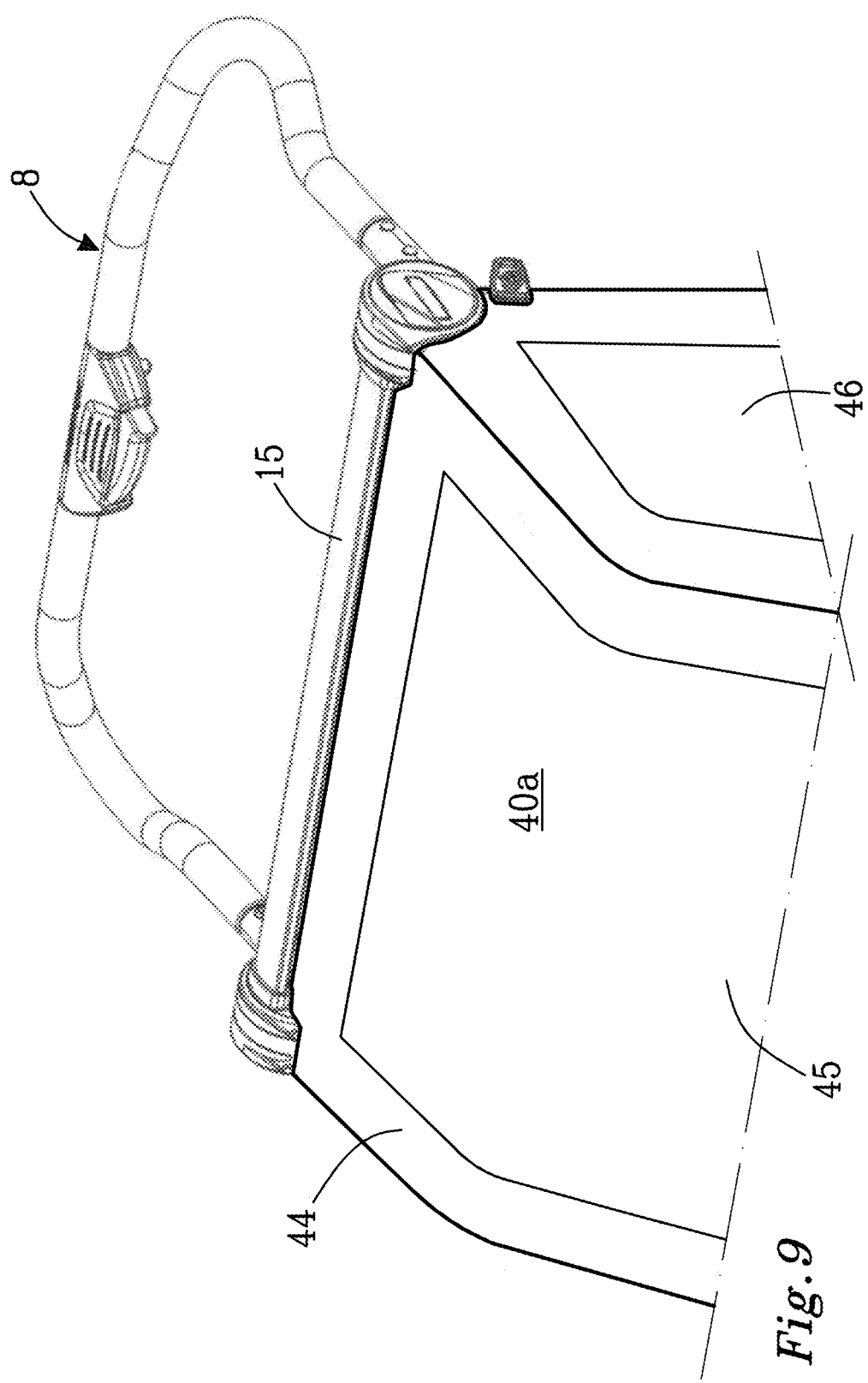
FIG. 9 shows a detail of the bicycle trailer frame in FIG. 1 in the area of the accessory cross bar with a trailer cover attached to the accessory cross bar.

Commonly available bicycle trailers have a passenger compartment with a size and shape defined by the bicycle trailer frame. The passenger compartment usually has side walls, a front wall, a roof and a rear wall. The front wall and the roof are often formed as a continuous sloped wall, with no apparent demarcation between the roof part and the front wall part. The front covering sheet 40a may form a roof 44 and a front portion 45 and optionally also side walls 46 as seen in FIG. 9. The rear covering sheet 40b may form a rear wall 47. FIG. 8 shows the accessory cross bar 15 with part of a roof 44 formed by the front covering sheet 40a and part of a rear wall 47 formed by the rear covering sheet 40b.

The stopping members at the ends of the covering sheets 40a, 40b need not be rods inserted in an end fold as shown in the figures. Alternative ways of attaching stopping members may be used such as gluing, welding, stapling, etc. may be used. Moreover, the stopping members may be integrally formed with the covering sheet and may, for instance, be a thickened edge portion of the covering sheet. A thickened edge portion may be accomplished by rolling or folding the covering material to create a multi-layered thickened structure along the edge of the covering sheet. The thickened portion can be stabilized by mechanical or adhesive bonding or by ultrasonic or thermal welding.

Figure 10:
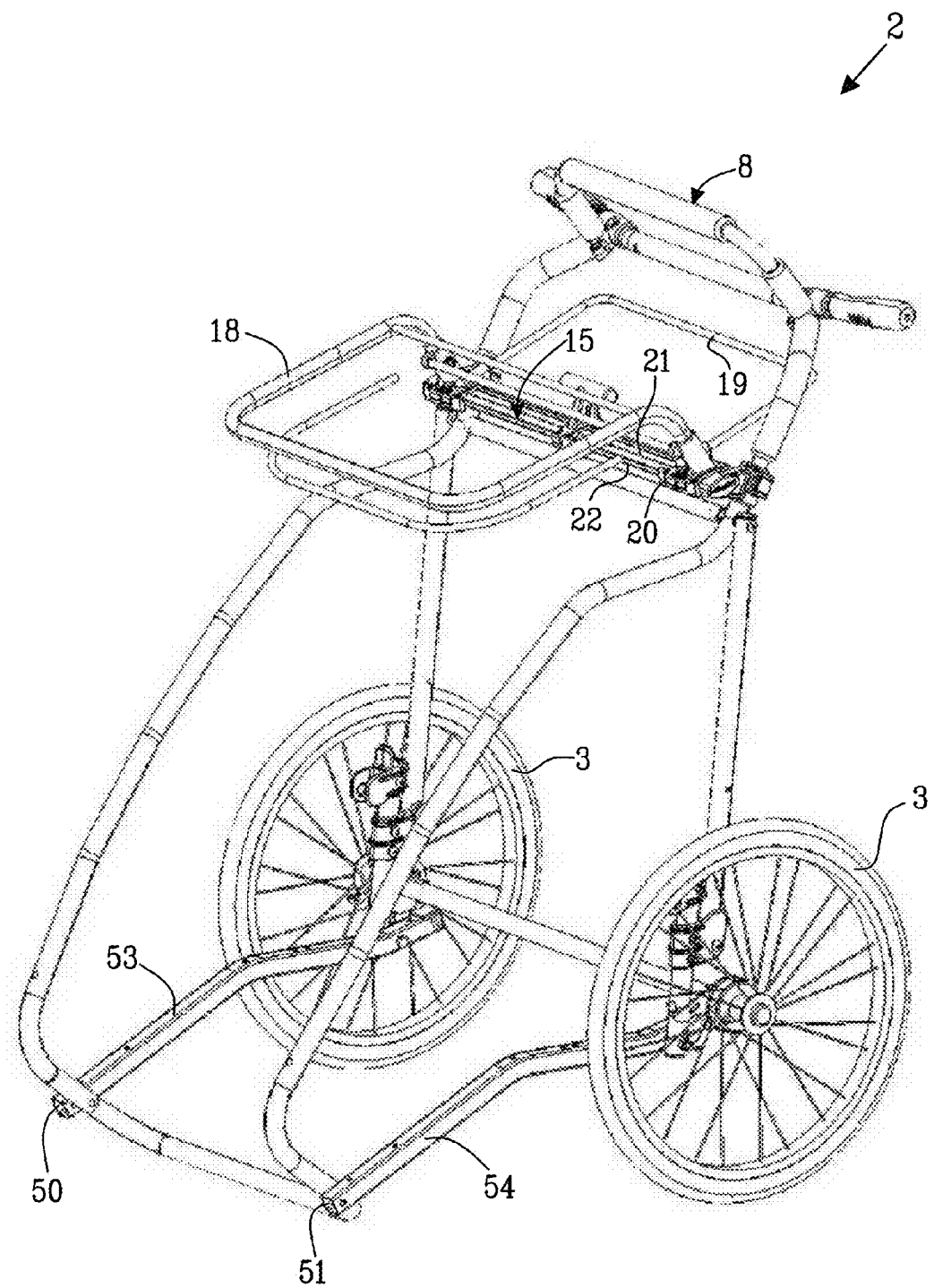
FIG. 10 shows a perspective view of a bicycle trailer frame with an accessory cross bar removably attached to the bicycle trailer frame.
Figure 11:
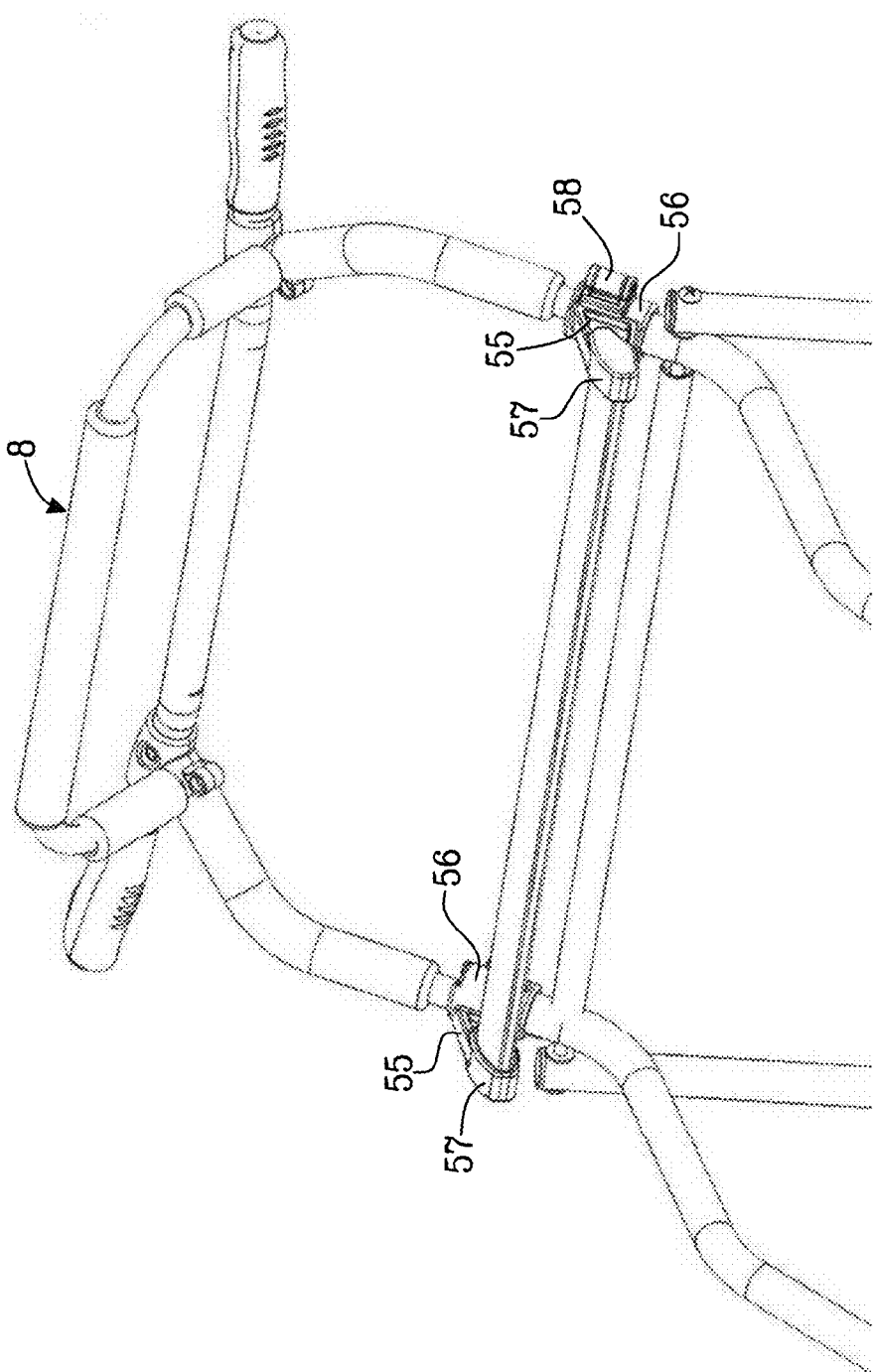
FIG. 11 shows a detail of the bicycle trailer frame in FIG. 1 in the area of the accessory cross bar without any accessories mounted on the accessory cross bar.

FIGS. 10 and 11 show a bicycle trailer frame 2 with only rear wheels 3 and a different construction of the push-handle 8 as compared with the bicycle trailer frame 2 in FIGS. 1-3. As these differences are inessential to the present invention, elements fulfilling the same function in the FIGS. 1-3 embodiment and in the FIGS. 10 and 11 embodiment have been designated the same reference numbers. The frame 2 shown in FIG. 10 has two connection points 50, 51 at the front of the bicycle frame 2. The connection points 50, 51 are arranged at open ends of longitudinally extending bicycle frame elements 53, 54 and are adapted to receive connecting members arranged on a front wheel arrangement or a bicycle coupling arrangement.

The accessories 18, 19 that are shown to be attached to the accessory cross bar 15 are the same as those shown in FIGS. 1-3 and they are attached in the same manner, with clamping members 20 clamped over the upper part 21 of the accessory cross bar 15.

A major difference between the accessory cross bar 15 shown in FIGS. 10 and 11 and the accessory cross bar 15 shown in FIGS. 1-3, is that the FIGS. 10 and 11 accessory cross bar 15 is attached to the bicycle trailer frame 2 as a separate member in addition to the parts assembled by the manufacturer of the bicycle trailer.

As is shown in FIG. 11, the accessory cross bar 15 is attached to the bicycle trailer frame 2 by means of attachment members 55 comprising a frame attachment part 56 and an accessory cross bar holder 57. The attachment members 55 allow the accessory cross bar 15 to be repeatedly attached to the bicycle trailer frame 2 and to be removed therefrom, without affecting the structure or function of the bicycle trailer frame 2.

The frame attachment part 56 of each attachment member 55 may be any type of attachment device suitable for the purpose, such as clamps, snap-on attachments, etc. The attachment member 55 shown in FIGS. 10 and 11 is provided with a releasable locking arrangement 58 for securing the attachment member 55 in a desired position on the bicycle trailer frame 2.

The invention claimed is:

1. An accessory cross bar for a passenger carrier, said passenger carrier comprising a frame and a push-handle at a rear end of said frame, characterized in that said accessory cross bar is adapted for horizontal mounting at said rear end of said passenger carrier frame and wherein said accessory cross bar is hollow and comprises an outer wall and an interior cavity, said accessory cross bar being a profiled accessory cross bar having an upper part and a lower part in a vertical direction and having a uniform shape in a longitudinal direction, said upper part having a rounded surface and said accessory cross bar having an asymmetric shape in a horizontal direction;

said lower part comprising an elongated opening in the form of a track such that said elongated opening uniformly extends along a length of the accessory cross bar and the width of said elongated opening is narrower than a width of said interior cavity, said elongated opening extending along said outer wall to permit access to said interior cavity and adapted to receive a cover sheet having a predetermined thickness.

2. The accessory cross bar according to claim 1, wherein said accessory cross bar comprises an inner vertical wall in said interior cavity.

3. The accessory cross bar according to claim 1, wherein said accessory cross bar comprises two inner vertical walls in said interior cavity.

4. The accessory cross bar according to claim 3, wherein said accessory cross bar comprises an inner horizontal wall extending between said two inner vertical walls in said interior cavity.

5. The accessory cross bar according to claim 1, wherein said interior cavity in said accessory cross bar is arranged to receive and retain an end portion of a cover sheet for covering of said passenger carrier frame.

6. The accessory cross bar according to claim 5, wherein said accessory cross bar comprises two inner cavities arranged to receive and retain an end portion of a cover sheet for covering of said passenger carrier frame.

7. The accessory cross bar according claim 1, wherein said accessory cross bar is an integral, pre-mounted part of said passenger carrier frame.

8. The accessory cross bar according to claim 1, wherein said accessory cross bar comprises attachment members for repeated attachment and removal of said accessory cross bar from said passenger carrier frame.

9. A passenger carrier bicycle trailer comprising a frame with a coupling arrangement at a front end of said frame for coupling of said bicycle trailer to a bicycle and a push-handle at a rear end of said frame, wherein said carrier bicycle trailer comprises an accessory cross bar according to claim 1 mounted at said rear end of said frame.

10. An accessory cross bar for a passenger carrier, said passenger carrier comprising a frame and a push-handle at a rear end of said frame, characterized in that said accessory cross bar is adapted for horizontal mounting at said rear end of said passenger carrier frame and said accessory cross bar comprising:

a hollow member having a uniform shape along a longitudinal direction, further having an outer wall and an interior cavity and an elongated opening uniformly extending along a longitudinal direction of said outer wall and having a width smaller than a width of said interior cavity;

an upper part and a lower part in a vertical direction, said upper part having a rounded surface;

an asymmetric shape in a horizontal direction; and wherein said interior cavity is arranged to receive and retain an end portion of a cover sheet for covering of said passenger carrier frame and where said interior cavity comprises a subcavity in a lower part of said interior cavity;

wherein a cover sheet for covering of said passenger carrier frame is secured to a rod and said rod is inserted into a portion of said interior cavity to secure the rod and the cover sheet to said accessory bar with said cover sheet extending through said elongated opening.

* * * * *